United States Patent

[11] 3,585,507

[72] Inventor Charles E. Bickel
Thousand Oaks, Calif.
[21] Appl. No 756,562
[22] Filed Aug. 30, 1968
[45] Patented June 15, 1971
[73] Assignee Burroughs Corporation
Detroit, Mich.

[54] PULSE DISCRIMINATION CIRCUITRY
12 Claims, 3 Drawing Figs.

[52] U.S. Cl. .......... 328/116, 328/147, 328/151, 328/148, 307/235
[51] Int. Cl. .......... H03k 5/20, H03k 17/30
[50] Field of Search .......... 328/115, 116, 117, 120, 135, 146, 147, 150, 165; 307/235

[56] References Cited

UNITED STATES PATENTS

| | | | |
|---|---|---|---|
| 2,820,895 | 2/1958 | Johnstone | 328/117 |
| 2,837,640 | 6/1958 | Goldsworthy | 328/117 |
| 3,267,375 | 8/1966 | Olsen | 328/116 |
| 3,392,307 | 7/1968 | Monnier | 328/147 |
| 3,437,834 | 4/1969 | Schwartz | 328/150 |
| 3,437,835 | 4/1969 | Mimken et al. | 328/151 |
| 3,456,201 | 7/1969 | Zrubek | 328/116 |

*Primary Examiner*—Donald D. Forrer
*Assistant Examiner*—Larry N. Anagnos
*Attorney*—Christie, Parker & Hale

ABSTRACT: An indication of a data pulse is produced each time a pulse signal being discriminated exceeds a threshold value in a bit cell, hereafter designated a threshold bit cell. Upon the detection of an amplitude peak in the first bit cell following a threshold bit cell, which may be substantially less than the threshold value, the pulse signal is examined during the second bit cell following the threshold bit cell. When the examination establishes that the peak amplitude of the pulse signal during the second bit cell exceeds the threshold value, an indication of a data pulse for the first bit cell is produced. When the examination establishes that the peak amplitude of the pulse signal during the second bit cell fails to exceed the threshold value, no indication of a data pulse for the first bit cell is produced.

INVENTOR.
CHARLES E. BICKEL
BY
Christie, Parker & Hale
ATTORNEYS.

INVENTOR.
CHARLES E. BICKEL
BY
Christie, Parker & Hale
ATTORNEYS

PULSE DISCRIMINATION CIRCUITRY

BACKGROUND OF THE INVENTION

This invention relates to binary data recovery circuits and, more particularly, to an improved arrangement for discriminating data pulses on an amplitude basis.

It is common practice in the data-handling art to reduce the effects of noise on pulse signals by amplitude discrimination. Base clippers and threshold detectors are commonly used to carry out amplitude discrimination. A base clipper transmits only that portion of the pulse signal that exceeds a threshold level, while transmitting a lower reference level at all other times. A threshold detector produces a binary output at one value while the pulse signal is below a threshold level and at the other value while the pulse signal is above the threshold level. Ideally, the threshold level in both devices is set above the maximum instantaneous amplitude that noise in the system attains and below the minimum peak amplitude that the data pulses attain. These ideal criteria are difficult to satisfy in practice. If the threshold level is set too low, excessive noise is transmitted along with the data pulses. In other words, an inefficient job of amplitude discrimination results, and noise may appear as data pulses in bit cells where no data pulses in fact are present. If the threshold level is set too high, some of the data pulses will have insufficient amplitude to exceed the threshold level and will be lost.

The pattern of the data pulses stored at high packing density, i.e., the presence or absence of pulses in the bit cells, may affect the instantaneous amplitude of noise and the peak amplitude of data pulses. An example of this takes place in the recovery of binary data stored on a magnetic surface such as a tape, a disc, or a drum in the form of nonreturn-to-zero (hereafter called NRZ) pulses. When the pulse pattern of NRZ pulses read from a magnetic surface consists of an isolated pulse separated by one or more bit cells from the pulses nearest to it, the peak amplitude of the pulse is relatively high. In pulse patterns having a series of pulses in successive bit cells, some intermediate pulses have relatively low peak amplitude although the first pulse in the series has a relatively high peak amplitude. Contrasting the peak pulse amplitude, the effect of the instantaneous noise amplitude is relatively large in gaps between pulses, i.e., in bit cells having no pulses, and is relatively small while a series of pulses occur in successive bit cells. The system parameters must be selected so the maximum instantaneous noise amplitude remains below the minimum peak amplitude of data pulses in order to permit satisfactory discrimination between data pulses and noise.

In a copending application of John A. Hibner and Michael I. Behr, Ser. No. 658,489, filed Aug. 4, 1967, entitled "PULSE DISCRIMINATION CIRCUITRY," and assigned to the assignee of the present application, an arrangement is disclosed and claimed that permits the utilization of higher packing densities for data storage on magnetic surfaces. Specifically, the arrangement discriminates on an amplitude basis at one of two threshold levels selected in response to the pattern of the data pulses. The high threshold level is normally used. Whenever a pulse is detected at the high threshold level, the arrangement switches to the low threshold level, where it remains as long as pulses continue to be detected in successive bit cells. The high threshold level is determined by the maximum instantaneous noise amplitude and the low threshold level is determined by the minimum peak pulse amplitude. However, the minimum peak pulse amplitude, which occurs between the extremities of a series of pulses in successive bit cells, becomes smaller as the packing density is increased. Therefore, the packing density is not permitted to be so high that the minimum peak pulse amplitude drops below the instantaneous noise amplitude expected in the bit cells occupied by a series of pulses.

SUMMARY OF THE INVENTION

It has been discovered that in a series of three or more NRZ pulses in successive bit cells, the peak amplitude of the third pulse in the series and any odd-numbered pulses thereafter is appreciably larger than the peak amplitude of the second pulse in the series and any even-numbered pulses thereafter until equilibrium is reached and positive and negative peak amplitudes are equal. Accordingly, the invention contemplates distinguishing the second pulse in a series of three or more pulses in successive bit cells from noise by ascertaining whether the third pulse in the series exceeds a first high threshold value.

Pulse discrimination circuitry is provided that normally produces a data indication for a bit cell when the peak amplitude of the pulse signal being discriminated exceeds a second high threshold value above the maximum instantaneous noise amplitude associated with the pulse signal. For the purpose of identification, such bit cells are hereafter designated threshold bit cells. Upon the detection of an amplitude peak in the first bit cell following a threshold bit cell, which may be substantially less than the threshold values, the pulse signal is examined during the second bit cell following the threshold bit cell. When the examination establishes that the peak amplitude of the pulse signal during the second bit cell exceeds the first threshold value, the pulse discrimination circuitry produces a data indication for the first bit cell. When the examination establishes that the peak amplitude of the pulse signal during the second bit cell fails to exceed the first threshold value, the pulse discrimination circuitry does not produce an indication for the first bit cell. Preferably, the first and second threshold values are identical, enabling the same circuitry to be employed to produce the indications for the threshold bit cells and the indications for the first bit cell following a threshold bit cell.

The pulse discrimination circuitry preferably comprises two channels each having at least three bistable stages connected in tandem. The first channel operates responsive to the coincidence of indications from a threshold detector and a peak detector. The second channel operates responsive to the coincidence of the same indications as the first channel or the coincidence of an indication from the peak detector and an indication from the threshold detector that in the preceding bit cell a pulse peak was present that exceeded the threshold value. The first and second channels are logically coupled to an output circuit that indicates the presence and absence of pulses in the bit cells. If the states of the last stage of the channels agree, either or both of the channels are coupled to the output circuit. If the states of the last stage of the channels fail to agree, a logical decision is made—the last stage of the second channel is coupled to the output circuit when the states of the middle stage of the channels agree, and neither of the channels is coupled to the output circuit when the states of the middle stage of the channels fail to agree. Interlock circuitry insures that this logical decision is made only once following a threshold bit cell. This prevents a false indication from being produced for a bit cell preceding an isolated data pulse.

BRIEF DESCRIPTION OF THE DRAWINGS

The features of a specific embodiment of the best mode contemplated of carrying out the invention are illustrated in the drawings, in which.

DETAILED DESCRIPTION OF A SPECIFIC EMBODIMENT

Figures 1, 2:
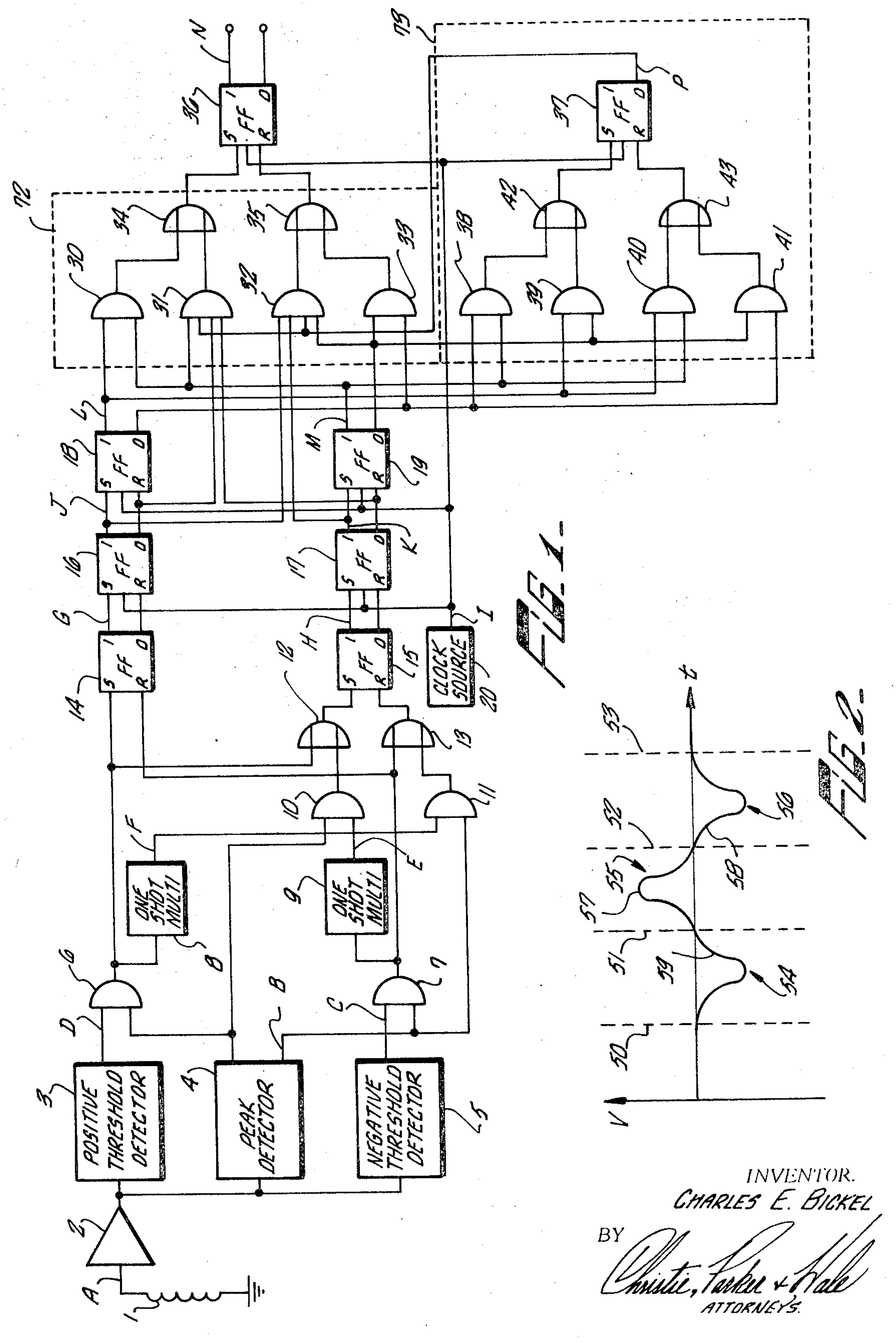
FIG. 1 is a schematic block diagram of pulse discrimination circuitry incorporating the principles of the invention.
FIG. 2 is a waveform diagram illustrating the effects of pulse crowding for a series of pulses in three successive bit cells.

The circuitry in FIG. 1 is suitable for the recovery of NRZ pulses stored on a magnetic surface such as a tape, a disc, or a drum. The data could be stored in conventional NRZ form, in which one direction of orientation of magnetic flux on the surface in a bit cell represents one binary value and the other direction of orientation of the magnetic flux on the surface in a bit cell represents the other binary value. The data could also be stored in modified NRZ form in which a flux reversal in either direction in a bit cell represents one binary value and the absence of a flux reversal in a bit cell represents the other binary value. In either case, a magnetic readhead 1, which is in close proximity to the magnetic surface, produces an electrical signal having a data pulse at each flux reversal.

FIG. 2 depicts the waveform of the readhead signal, voltage as a function of time, when a series of flux reversals in three successive bit cells occur. The bit cells are defined in FIG. 2 by vertical dashed lines 50, 51, 52, and 53. No data pulse occurs in the bit cell to the left of line 50; a data pulse 54 occurs in the bit cell between lines 50 and 51; a data pulse 55 occurs in the bit cell between lines 51 and 52; and a data pulse 56 occurs in the bit cell between lines 52 and 53. Each of pulses 54, 55, and 56 has a peak 57, a leading portion 58, and a trailing portion 59. As the packing density of the data on the magnetic storage medium is increased, the time interval between the pulses shrinks. Thus, trailing portion 59 of pulse 54 and leading portion 58 of pulse 56 begin to merge and to reduce the amplitude of peak 57 of pulse 55. It is to be noted, however, that although the peak amplitude of pulse 55 is severely reduced the amplitude of peak 57 of pulse 56 remains substantially at the same high amplitude as pulse 54, the first pulse in the series. The described consequences of pulse crowding also occur in longer series of data pulses. Each even-numbered pulse, e.g., second, fourth, sixth, etc., is generally smaller in peak amplitude than the odd numbered pulse, e.g., first, third, fifth, etc., that precedes it. However the worst case is the three-pulse series. According to the invention, NRZ pulse signals are discriminated on the basis of a criterion that recognizes the described phenomenon illustrated in FIG. 2. This criterion is as follows:

1. A data indication is given each time the peak amplitude of the pulse signal being discriminated exceeds a threshold value in a bit cell designated a threshold bit cell.

2. Each time the pulse signal being discriminated exhibits a peak amplitude, which may be substantially less than the threshold value, in the first bit cell following a threshold bit cell:

a. A data indication is also given if the peak amplitude of the pulse signal being discriminated during the second bit cell following the threshold bit cell exceeds the threshold value.

b. No data indication is given if the peak amplitude of the pulse signal during the second bit cell following the threshold bit cell fails to exceed the threshold value.

Figure 3:
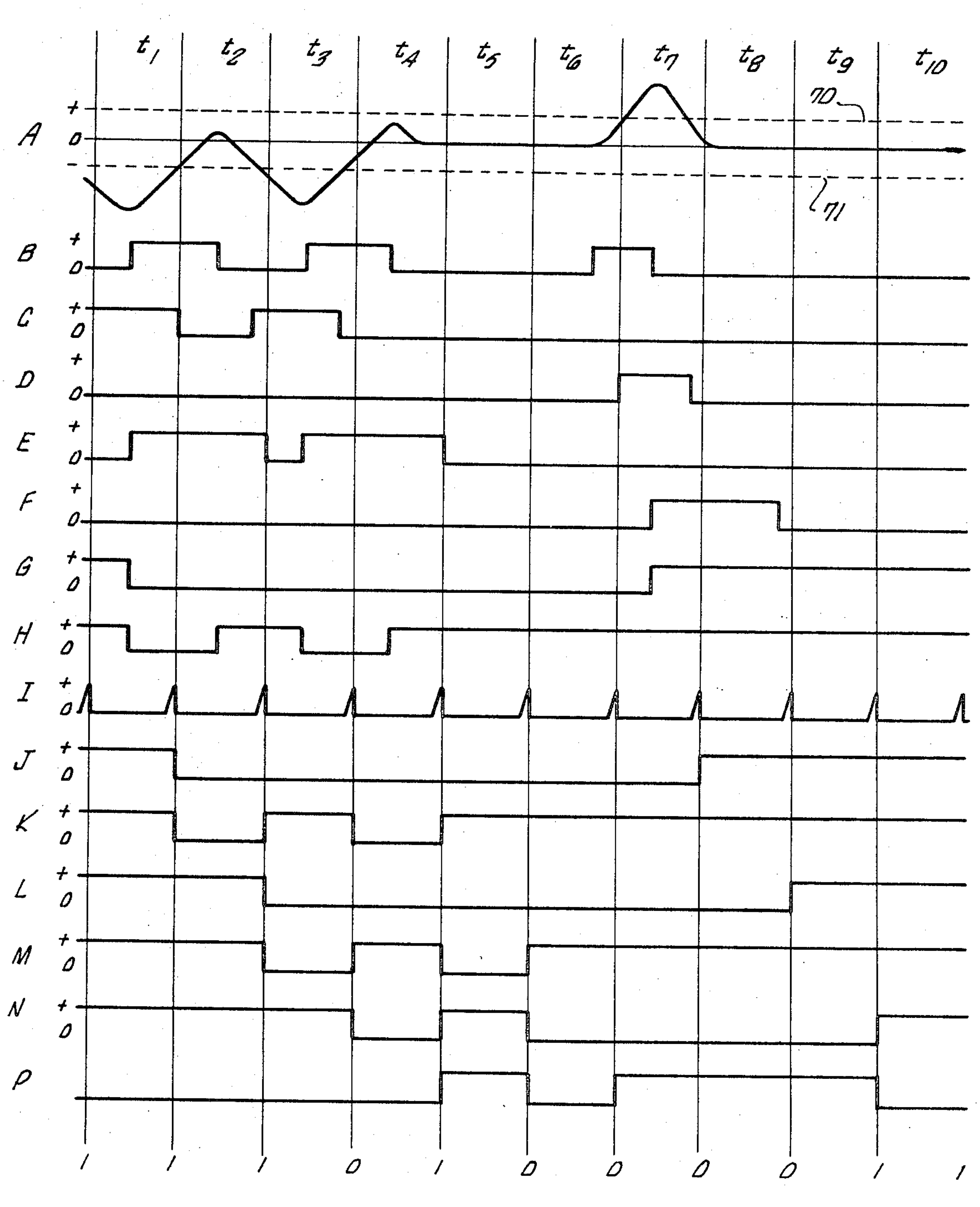
FIG. 3 is a group of waveform diagrams representing the signals appearing at various points in the circuitry of FIG. 1 as a function of time.

Waveforms A through P IN FIG. 3 represent the signals appearing at the points in the circuitry of FIG. 1 designated by the same letters. Ten-bit cells, designated $t_1$ through $t_{10}$, are depicted in FIG. 3. The electrical signal generated by readhead 1, which is represented by waveform A of FIG. 3, is coupled through an amplifier 2 to the inputs of a positive threshold detector 3, a peak detector 4, and a negative threshold detector 5. Assuming that the data is stored on the storage medium in conventional NRZ form, bit cells $t_1$ through $t_{10}$ contain respectively the binary values 0100001111. Positive threshold detector 3 is a conventional circuit having a bistable output that is at ground potential while the amplitude of the readhead signal applied to its input is below a positive threshold value represented by dashed line 70 in waveform A, and is at a positive potential while the amplitude of the readhead signal applied to its input is above the threshold value. Negative threshold detector 5 is a conventional circuit having a bistable output that is at ground potential while the amplitude of the readhead signal applied to its input is below a negative threshold value represented by dashed line 71 in waveform A and is at a positive potential while the amplitude of the readhead signal applied to its input is above the threshold value. Waveforms C and D of FIG. 3 depict the outputs of detectors 5 and 3, respectively. Peak detector 4 is a conventional circuit that has two complementary bistable outputs. As depicted in waveform B of FIG. 3, one of the outputs of peak detector 4 changes from ground potential to a positive potential each time a negative peak in the readhead signal is sensed, and from the positive potential to ground potential each time a positive peak in the readhead signal is sensed. The other output of peak detector 4 changes state from a positive potential to ground potential each time a negative peak in the readhead signal is sensed and from ground potential to the positive potential each time a positive peak in the readhead signal is sensed. Peak detector 4, being sufficiently sensitive to indicate each and every peak represented by a data pulse, is also responsive to amplitude peaks that are substantially less than the threshold values of detectors 3 and 5, including some noise peaks.

Flip-flops 14, 16, and 18 connected in tandem comprise a first bistable channel and flip-flops 15, 17, and 19 connected in tandem comprise a second bistable channel. The outputs of the first and second bistable channels are coupled by a logic circuit 72 to the input of a flip-flop 36. Flip-flop 36 comprises an output circuit that indicates the presence of a positive data pulse in the readhead signal by a change in state in one direction and a negative data pulse in the readhead signal by a change in state in the other direction. A flip-flop 37 forms part of an interlock circuit 73, the function of which is described in detail below. Flip-flops 14 through 19, 36, and 37 each have two complementary outputs designated "1" and "0," respectively, and two inputs designated "S" and "R," respectively. When a signal of positive potential is applied to the "S" input of one of the flip-flops, the flip-flop is set, the "1" output assuming a positive potential and the "0" output assuming ground potential. When a signal of positive potential is applied to the "R" input of one of the flip-flops, the flip-flop is reset, the "0" output assuming a positive potential and the "1" output assuming ground potential. Flip-flops 14 and 15 operate in the so-called R-S mode, i.e., their outputs change state immediately upon the application of a positive potential signal to one of their inputs. Flip-flops 16 through 19, 36, and 37 operate in the so-called J-K mode, i.e., their outputs only change state at the time of application of clock pulses from a clock source 20. The clock pulses from source 20, which are represented in waveform I, occur at the end of each bit cell. These clock pulses can be derived from a clock track associated with the storage medium or from the data itself by self-timing techniques in accordance with common practice.

The output of positive threshold detector 3 and one output of peak detector 4 are applied to the inputs of an AND gate 6. The output of negative threshold detector 5 and the other output of peak detector 4 are applied to the inputs of an AND gate 7. The outputs of AND gates 6 and 7 are connected respectively to the "S" input and the "R" input of flip-flop 14. The "1" output of flip-flop 14 is represented by waveform G of FIG. 3, and the "0" output of flip-flop 14 is the complement of waveform G. When the readhead signal at the output of amplifier 2 has a negative peak amplitude that exceeds the negative threshold value, the output of AND gate 7 assumes a positive potential and flip-flop 14, being then set, becomes reset, as depicted in time slot $t_1$ of FIG. 3. When the readhead signal at the output of amplifier 2 has a positive peak amplitude that exceeds the positive threshold value, the output of AND gate 6 assumes a positive potential and flip-flop 14, being then reset, becomes set, as depicted in time slot $t_7$ of FIG. 3. It is to be noted that no change of state of flip-flop 14 takes place in bit cell $t_3$ because flip-flop 14 is already in the reset condition when the output of AND gate 7 assumes a positive potential. Thus, the state of flip-flop 14 represents the data pulses of the readhead signal as discriminated at the positive and negative threshold values. The data pulses of the readhead signal that do not exceed the threshold value, such as the data pulse in bit cell $t_2$, are not represented by the state of flip-flop 14.

The output of AND gate 6 is coupled to a one-shot multivibrator 8 and the output of AND gate 7 is coupled to a one-shot multivibrator 9. Multivibrators 8 and 9 are conventional monostable circuits, each of whose outputs assumes a positive potential for a period of time equal to one and one-half bit cells responsive to a change in state from ground potential to a positive potential at its input. The output of multivibrator 8 and one output of peak detector 4 are applied to the inputs of an AND gate 11. The outputs of AND gates 11 and 7 are coupled through an OR gate 13 to the "R" input of flip-flop 15. The output of multivibrator 9 and the other output of peak detector 4 are applied to the inputs of an AND gate 10. The outputs of AND gates 10 and 6 are coupled through an OR gate 12 to the "S" input of flip-flop 15.

Each time a data pulse having a peak amplitude exceeding the threshold value occurs in the readhead signal, one of multivibrators 8 or 9, depending upon the polarity of such data pulse, produces for AND gate 10 or AND gate 11 an enabling signal that lasts until the end of the next bit cell. This is depicted by waveform E of FIG. 3 during bit cells $t_1$ and $t_2$ and by waveform F of FIG. 3 during bit cell $t_7$. When peak detector 4 senses a peak of the opposite polarity in the readhead signal during the next bit cell, the output of AND gate 10 or AND gate 11 assumes a positive potential and flip-flop 15 responds accordingly, as illustrated by waveform H of FIG. 3 in bit cell $t_2$. Waveform H changes state from ground potential to a positive potential during bit cell $t_2$ because multivibrator 9, which was triggered during bit cell $t_1$ is at a positive potential when peak detector 4 senses the positive peak in bit cell $t_2$. Irrespective of the actuation of multivibrators 8 and 9, the state of flip-flop 15 is also controlled by the outputs of AND gates 6 and 7, Which also control flip-flop 14. In summary, the states of flip-flops 14 and 15 are identical at the end of a bit cell if a data pulse having a peak amplitude that exceeds the threshold value has occurred in that bit cell. Such bit cells are called threshold bit cells in this specification. (Compare waveforms G and H OF FIG. 3 in threshold bit cells $t_1$, $t_3$, and $t_7$). The states of flip-flops 14 and 15 become different when peak detector 4 senses a peak of the appropriate polarity with a smaller amplitude than the threshold value in the bit cell following a threshold bit cell. (Compare waveforms G and H of FIG. 3 in bit cells $t_2$ and $t_4$). After the state of flip-flop 15 becomes different from the state of flip-flop 14 in bit cell $t_4$, it remains different until bit cell $t_7$, when the threshold is exceeded again.

The difference in the states of flip-flops 14 and 15 occurring in bit cell $t_2$ results from a data pulse whose peak amplitude fails to exceed to positive threshold value represented by line 70. The fact that this is a data pulse rather than noise is established by examining the readhead signal in the next bit cell, namely bit cell $t_3$. The presence of a data pulse in bit cell $t_3$ whose peak amplitude exceeds the negative threshold value signifies that the peak in bit cell $t_2$ is a data pulse. In other words, the peak detected in bit cell $t_2$ is determined to be a data pulse because a threshold bit follows it. As illustrated by a comparison of waveforms G and H of FIG. 3, the states of flip-flops 14 and 15 at the end of bit cell $t_3$ are identical. In contrast to bit cell $t_2$, the difference in the states of flip-flops 14 and 15 occurring in bit cell $t_4$ results from a noise peak. This fact is established by examining the readhead signal in the next bit cell, namely bit cell $t_5$. The absence of a data pulse in bit cell $t_5$ whose peak amplitude exceeds the threshold value signifies that the peak in bit cell $t_4$ is noise. In other words, the peak detected in bit cell $t_4$ is determined to be noise because a threshold bit cell does not follow it. As illustrated by a comparison of waveforms G and H of FIG. 3, the states of flip-flops 14 and 15 at the end of bit cell $t_5$ are different.

At the end of each bit cell the states of flip-flops 14 and 15 are shifted to flip-flops 16 and 17, respectively, responsive to a clock pulse and at the end of the next following bit cell these states are further shifted to flip-flops 18 and 19, respectively, responsive to a clock pulse. Thus, the data contained in the readhead signal during three successive bit cells is stored in the first and second bistable channels at all times.

Logic circuit 72 comprises AND gates 30 through 33 and OR gates 34 and 35. The "1" output of flip-flop 18 and "1" output of flip-flop 19 are applied to the inputs of AND gate 30, while the "0" output of flip-flop 18 and the "0" output of flip-flop 19 are applied to the inputs of AND gate 33. The "1" output of flip-flop 19, the "0" output of flip-flop 37, the "0" output of flip-flop 16, and the "0" output of flip-flop 17 are all applied to the inputs of AND gate 31. Similarly, the "0" output of flip-flop 19, the "0" output of flip-flop 37, the "1" output of flip-flop 16, and the "1" output of flip-flop 17 are all applied to the inputs of AND gate 32. The outputs of AND gates 30 and 31 are coupled through OR gate 34 to the "S" input of flip-flop 36. The outputs of AND gates 32 and 33 are coupled through OR gate 35 to the "R" input of flip-flop 36.

Whenever the states of flip-flops 18 and 19 are identical, the state of flip-flop 36 is made to conform thereto responsive to a clock pulse at the end of the bit cell. Thus, if the "1" outputs of flip-flops 18 and 19 are both at a positive potential, the output of AND gate 30 and the "S" input of flip-flop 36 are also at a positive potential, thereby setting flip-flop 36 and placing its "1" output at a positive potential. This is depicted by waveforms L, M, and N OF FIG. 3 at the end of bit cell $t_9$. If the "0" outputs of flip-flops 18 and 19 are both at a positive potential, the output of AND gate 33 and the "R" input of flip-flop 36 are also at a positive potential, thereby resetting flip-flop 36 and placing its "0" output at a positive potential. This is depicted by waveforms L, M, and N of FIG. 3 at the end of the bit cells $t_3$ and $t_5$.

Whenever the states of flip-flops 18 and 19 are different and at the same time the states of flip-flops 16 and 17 are identical and flip-flop 37 is reset, the state of flip-flop 36 is made to conform to the state of flip-flop 19. If the "0" output of flip-flop 16, the "0" output of flip-flop 17, and the "0" output of flip-flop 37 are all at a positive potential, the "1" output of flip-flop 19 must be at a positive potential for a data pulse because successive data pulses are of opposite polarity. In such case, the output of AND gate 31 and the "S" input of flip-flop 36 are also at a positive potential, thereby setting flip-flop 36 and placing its "1" output at a positive potential. This is depicted by waveforms J, K, M, and N of FIG. 3 at the end of bit cell $t_4$. Similarly, if the "1" output of flip-flop 16, and the "1" output of flip-flop 17, and the "0" output of flip-flop 37 are all at a positive potential, the "0" output of flip-flop 19 must be at a positive potential for a data pulse. In such case, the output of AND gate 32 and the"R" input of flip-flop 36 are at a positive potential, thereby resetting flip-flop 36 and placing its "0" output at a positive potential. This is not depicted in the waveforms of FIG. 3.

The states of flip-flops 14 and 15 are shifted responsive to the clock pulses at the end of each bit cell, first to flip-flops 16 and 17, respectively, second to flip-flops 18 and 19, respectively, and third, if the logical criterion established by circuit 72 is met, to flip-flop 36. As a result, the data pulses in the readhead signal at the output of amplifier 2 are indicated by changes in state of flip-flop 36 after a delay of about 2½ bit cells. This is depicted by the binary values "1" and "0" appearing under waveform P of FIG. 3 at the end of each bit cell.

Interlock circuit 73, which comprises AND gates 38 through 41, OR gates 42 and 43, and flip-flop 37, insures that flip-flop 36 changes state responsive to a pulse peak not exceeding the threshold value only once after any threshold bit cell. The "1" output of flip-flop 18 and the "0" output of flip-flop 19 are applied to the inputs of AND gate 39. The "0" output of flip-flop 18 and the "1" output of flip-flop 19 are applied to the inputs of AND gate 38. The outputs of AND gates 38 and 39 are coupled through an OR gate 42 to the "S" input of flip-flop 37. The "1" output of flip-flop 18 and the "1" output of flip-flop 19 are applied to the inputs of AND gate 40. The "0" output of flip-flop 18 and the "0" output of flip-flop 19 are applied to the inputs of AND gate 41. The outputs of AND gates 40 and 41 are coupled through an OR gate 43 to the "R" input of flip-flop 37. When the states of flip-flops 18 and 19 in a bit cell are different, the output of AND gate 38 and 39 assumes a positive potential and flip-flop 37 is set. Thereafter flip1flop 37 remains set until the states of flip-flops 18 and 19 are again identical in a bit cell, at which time the output of AND gate 40 or 41 assumes a positive potential and flip-flop 37 is reset. As long as flip-flop 37 is set, AND gates 31 and 32 are disabled, i.e., their outputs are not capable of assuming a positive potential regardless of the states on their other inputs. In terms of the operation of the circuitry, this means that no change in the state of flip-flop 36 can take place until the states of flip-flops 18 and 19 are again identical. Basically, interlock circuit 73 prevents flip-flop 36 from erroneously changing state immediately prior to the occurrence of a data pulse after an interval in which no data pulses occurred. This situation is illustrated by the waveforms of FIG. 3. The noise peak occurring in bit cell $t_4$ causes flip-flops 18 and 19 to have different states until the data pulse occurring in bit cell $t_7$ makes these states identical at the end of bit cell $t_9$. At the end of bit cell $t_8$, the states of flip-flops 16 and 17 are identical but flip-flop 36 does not change state because flip-flop 37 is then set. Where interlock circuit 73 not provided, flip-flop 36 would change state at the end of bit cell $t_8$, to indicate falsely the presence of a data pulse in bit cell $t_6$.

In the circuitry of FIG. 1, the same threshold value is used to detect the presence of data pulses in a threshold bit cell and in the second bit cell following a threshold bit cell. Thus, the same threshold detectors serve two functions. The single threshold value must be high enough to reject noise and low enough to detect data pulses in the second bit cell following a threshold bit cell. Sometimes, it may be advantageous to modify the circuitry so as to employ separate threshold values for the two functions, one threshold value for detecting the presence of data pulses in a threshold bit cell and a lower threshold value for detecting the presence of data pulses in the second bit cell following a threshold bit cell.

What I claim is:

1. Pulse discrimination circuitry for distinguishing from noise a pulse signal that represents data by the presence and absence of pulses in bit cells comprising:

first means for producing an indication for a bit cell when the peak amplitude of the pulse signal exceeds a threshold value, such bit cells being designated threshold bit cells;

second means responsive to the occurrence of an amplitude peak of the pulse signal during the first bit cell following a threshold bit cell for examining the pulse signal during the second bit cell following the threshold bit cell; and third means responsive to the second means for producing an indication for the first bit cell when the peak amplitude of the pulse signal during the second bit cell exceeds a threshold value.

2. The pulse discrimination circuitry of claim 1, in which the third means produces an indication for the first bit cell when the peak amplitude of the pulse signal during the second bit cell exceeds a threshold value without producing an indication when the peak amplitude of the pulse signal during the second bit cell fails to exceed the threshold value.

3. The pulse discrimination circuitry of claim 2, in which the threshold value for the threshold bit cells is the same as the threshold value for the second bit cells.

4. The pulse discrimination circuitry of claim 2, in which fourth means are provided for storing a representation of the data in the pulse signal during each bit cell in succession, fifth means are provided for storing a representation of the data in the pulse signal during each bit cell in succession following the bit cell represented by the fourth means, the first means is responsive to the representations stored by the fourth means, and the second means examines the representations stored by the fifth means.

5. Pulse discrimination circuitry for distinguishing from noise a pulse signal that represents data by the presence and absence of pulses in bit cells comprising:

first means for producing an indication for a bit cell when the peak amplitude of the pulse signal exceeds a threshold value, such bit cells being designated threshold bit cells;

second means responsive to the occurrence of an amplitude peak of the pulse signal substantially less than the threshold value during the first bit cell following a threshold bit cell for examining the pulse signal during the second bit cell following the threshold bit cell; and third means responsive to the second means for producing an indication for the first bit cell when the peak amplitude of the pulse signal during the second bit cell exceeds a threshold value without producing an indication when the peak amplitude of the pulse signal during the second bit cell fails to exceed the threshold value.

6. Pulse discrimination circuitry for distinguishing from noise a pulse signal that represents data by the presence and absence of pulses in bit cells comprising:

means for producing an indication for a bit cell when the peak amplitude of the pulse signal exceeds a threshold value, such bit cells being designated threshold bit cells; and means responsive to the occurrence of an amplitude peak of the pulse signal during the first bit cell following a threshold bit cell for producing an indication for the first bit cell when the bit cell following the first bit cell is an threshold bit cell.

7. A pulse discrimination system comprising:

a source of pulse signals representing data by the presence and absence of pulses in successive time intervals;

a first bistable channel connected to the source, the first channel-changing state in correspondence to each time interval in which the pulse signal exceeds a threshold value, such time intervals being designated threshold intervals;

a second bistable channel connected to the source, the second channel-changing state in correspondence to the next time interval following the threshold time interval if the pulse signal exhibits an amplitude peak and in correspondence to each threshold interval;

an output circuit to indicate the time intervals in which pulses occur in the pulse signal; and logic means operative in correspondence to each time interval if the states of the channels agree to couple the first channel to the output circuit, and if the states of the channels fail to agree to couple the second channel to the output circuit when the states of the channels caused by the pulse signal during the next subsequent time interval agree.

8. The pulse discrimination system of claim 7, in which the logic means couple the second channel to the output circuit only once following each threshold interval.

9. The pulse discrimination system of claim 7, in which the first and second bistable channels each comprise first, second, and third flip-flops connected in tandem such that the state of the first flip-flop is shifted to the second flip-flop at the end of each time interval and the state of the second flip-flop is shifted to the third flip-flop at the end of each time interval, the first flip flop of each channel is connected to the source, the logic means couple the third flip-flop of one of the channels to the output circuit when the states of the third flip-flops of the channels agree, and the logic means couple the third flip-flop of the second channel to the output circuit when the states of the third flip-flops of the channels fail to agree while the states of the second flip-flops of the channels agree.

10. The pulse discrimination system of claim 9, in which the logic means couple the second channel to the output circuit only once following each threshold interval.

11. The pulse discrimination system of claim 10, in which the first flip-flop of the first channel changes state responsive to the coincidence of indications from a threshold detector means and a peak detector means that monitor the pulse signals and the first flip-flop of the second channel changes state responsive to the coincidence of indications from the threshold detector means and the peak detector means or the coincidence of an indication from the peak detector means and an indication from the threshold detector means that in the preceding time interval the pulse signal exceeded the threshold value.

12. The pulse discrimination system of claim 11, in which the pulses of the pulse signal representing data alternate in polarity, the threshold detector means senses positive and negative thresholds, and the peak detector means senses positive and negative peaks.